United States Patent
Levin et al.

(10) Patent No.: US 8,196,550 B2
(45) Date of Patent: Jun. 12, 2012

(54) SOLAR-POWERED BALL

(75) Inventors: Mark Levin, Papillion, NE (US); Gwendolyn Newsome, Omaha, NE (US); Ryan P. Davidson, Evansville, IN (US)

(73) Assignee: Sergeant's Pet Care Products, Inc., Omaha, NE (US)

( * ) Notice: Subject to any disclaimer, the term of this patent is extended or adjusted under 35 U.S.C. 154(b) by 9 days.

(21) Appl. No.: 12/719,578

(22) Filed: Mar. 8, 2010
(Under 37 CFR 1.47)

(65) Prior Publication Data

US 2011/0214616 A1   Sep. 8, 2011

(51) Int. Cl.
*A01K 29/00* (2006.01)

(52) U.S. Cl. ............ 119/707; 119/709; 473/570

(58) Field of Classification Search ........... 119/702, 119/707, 709, 710, 711; 446/175, 219, 484; 482/45, 44, 110; 473/570, 571; *A01K 29/00*
See application file for complete search history.

(56) References Cited

U.S. PATENT DOCUMENTS

| | | | |
|---|---|---|---|
| 1,862,996 A | | 6/1932 | Arnold |
| 2,903,820 A | * | 9/1959 | Cornell ............ 446/439 |
| 3,304,651 A | | 2/1967 | Deyerl |
| 3,580,575 A | | 5/1971 | Speeth |
| 4,310,987 A | * | 1/1982 | Chieffo ............ 446/458 |
| 4,963,117 A | | 10/1990 | Gualdoni |
| 5,054,778 A | | 10/1991 | Maleyko |
| 5,066,011 A | | 11/1991 | Dykstra |
| 5,102,131 A | | 4/1992 | Remington |
| 5,236,383 A | | 8/1993 | Connelly |
| 5,388,825 A | * | 2/1995 | Myers et al. ............ 473/570 |
| 5,725,445 A | | 3/1998 | Kennedy |
| 5,779,574 A | | 7/1998 | Allman |
| 5,779,575 A | | 7/1998 | Hsieh |
| 5,819,690 A | | 10/1998 | Brown |
| 5,924,942 A | | 7/1999 | Gentile |
| 6,280,344 B1 | | 8/2001 | Robb |
| 6,404,409 B1 | | 6/2002 | Solomon |
| 6,428,432 B1 | | 8/2002 | Kachel |
| 6,527,675 B1 | * | 3/2003 | Yu ............ 482/44 |
| 6,666,782 B1 | | 12/2003 | Wu |
| 6,733,149 B1 | | 5/2004 | Chuang |
| D494,716 S | | 8/2004 | Chang |
| 7,074,106 B1 | | 7/2006 | Deutsch et al. |
| 7,163,313 B2 | | 1/2007 | Rosenberg |
| 7,261,432 B1 | | 8/2007 | Habitz |
| D552,307 S | | 10/2007 | Renforth et al. |
| 2001/0049311 A1 | | 12/2001 | Lewis et al. |

(Continued)

OTHER PUBLICATIONS

Sergeant's webpage—Caring for Pets Since 1868—Zoink Fetch 'n Flash Ball, Product No. 07068 (3 pages).

(Continued)

*Primary Examiner* — Rob Swiatek
*Assistant Examiner* — Kathleen Iwasaki
(74) *Attorney, Agent, or Firm* — Brian B. Diekhoff; Polsinelli Shughart PC

(57) ABSTRACT

A solar-powered ball is described. The solar-powered ball includes a member positioned in an interior of the solar-powered ball. The member comprises a solar panel that powers motion-activated lights. The solar-powered ball provides a pet toy. The solar-powered ball further includes an internal frame that supports an outer shell. The outer shell allows solar or light radiation to pass through to the solar panel in order to power the motion-activated lights.

23 Claims, 6 Drawing Sheets

U.S. PATENT DOCUMENTS

| | | |
|---|---|---|
| 2003/0224885 A1 | 12/2003 | Leal et al. |
| 2004/0048720 A1* | 3/2004 | Kuo ................................ 482/45 |
| 2005/0113214 A1* | 5/2005 | Chuang et al. .................. 482/44 |
| 2005/0261083 A1 | 11/2005 | Liao |
| 2006/0162673 A1* | 7/2006 | Hurwitz ........................ 119/709 |
| 2006/0249096 A1 | 11/2006 | Gick |
| 2007/0283612 A1 | 12/2007 | Shaw et al. |
| 2009/0042658 A1 | 2/2009 | Suit |
| 2009/0314221 A1 | 12/2009 | Wang |
| 2010/0048359 A1* | 2/2010 | Chuang et al. .................. 482/44 |
| 2011/0237367 A1* | 9/2011 | Kodama et al. ............... 473/570 |

OTHER PUBLICATIONS

Notice of Allowance dated Mar. 28, 2011 for U.S. Appl. No. 29/354,134 to Levin et al. (12 pages).

* cited by examiner

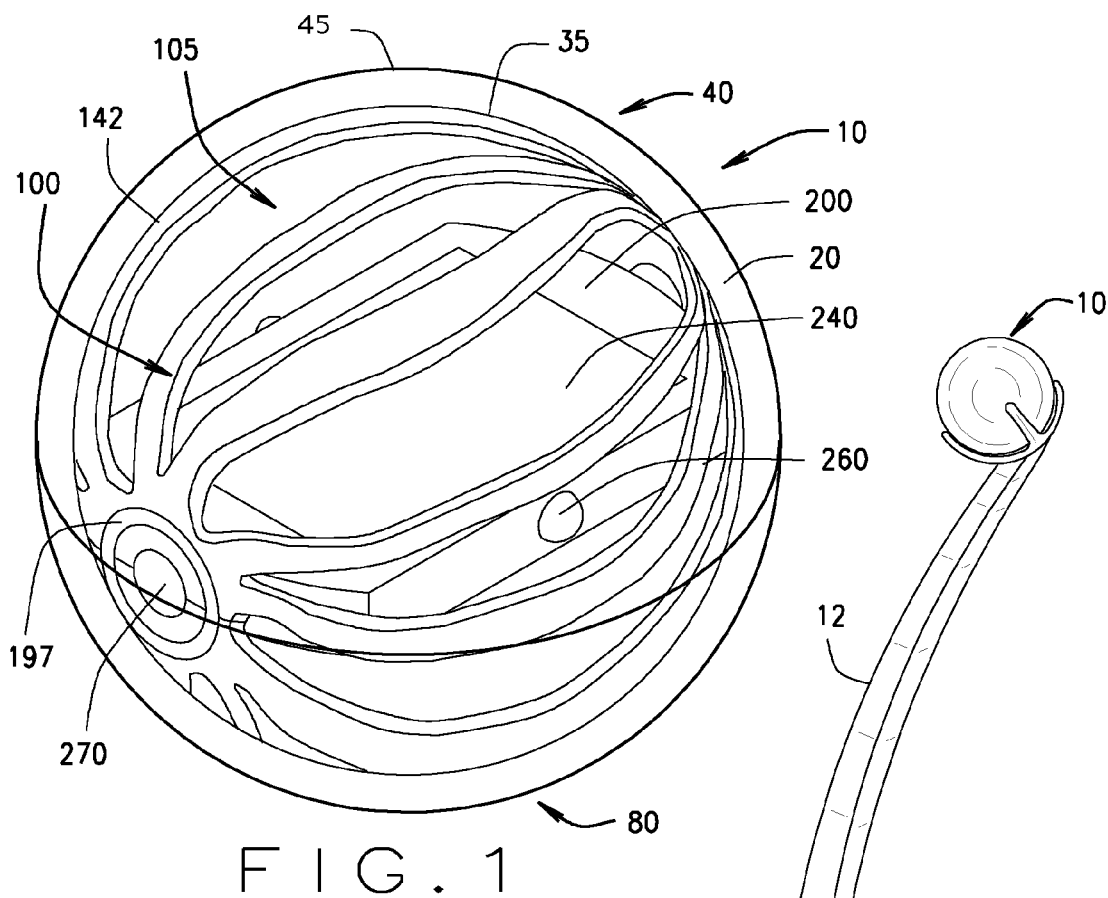
FIG. 1
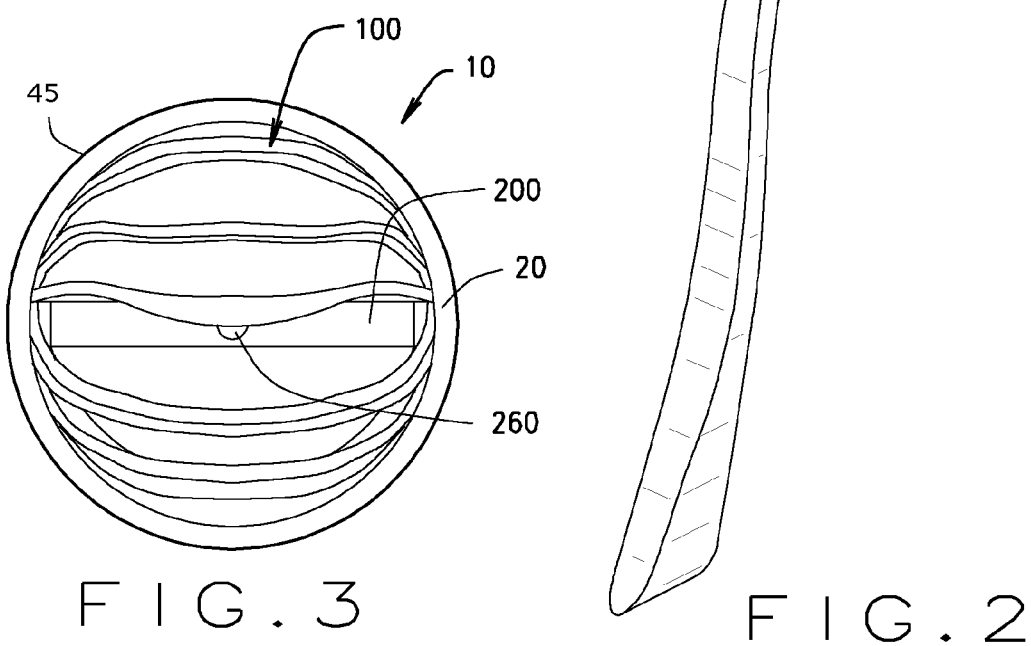
FIG. 3
FIG. 2

SOLAR-POWERED BALL

FIELD OF THE INVENTION

The present invention relates to a solar-powered ball. The solar-powered ball includes a member with a light therein.

BACKGROUND OF INVENTION

Many animals are naturally prone to chew on or bite their toys as part of routine play or activities. As such, pet toys with internal electrical components are generally manufactured to isolate the electrical components from the animal in order to prevent the animal from ingesting the electrical components. Typically, such pet toys are constructed with an internal, permanent battery to power the pet toy. The internal, permanent battery is not rechargeable or replaceable. As such, after the internal, permanent battery has lost its electrical charge, it loses the ability to power the pet toy. The dog, cat, or other animal may consequently lose interest in the pet toy, and disposal or replacement of the pet toy may be required. Pet owners may not wish to throw away their old toy in favor of buying a new toy.

A pet toy using replaceable batteries requires an external hatch or a door for replacement of the batteries, which would be extremely vulnerable to a biting or chewing animal. If the animal were able to chew open the door or hatch of such a pet toy, the batteries and electrical components may prove hazardous to the health of the animal.

SUMMARY OF INVENTION

A solar-powered ball is described. The solar-powered ball provides an excellent pet toy. The ball may be thrown and retrieved by the pet. The ball has an external shell. A frame is positioned inside of the external shell. The frame is in contact with an inner surface of the external shell. A member with a power unit and at least one light is held by the frame.

The combination of the external shell and the frame provides a durable and sturdy pet toy that withstands the chewing and biting of an animal. The at least one light attracts the animal's attention in order to entice the animal to play.

In one aspect, the ball includes an outer shell having an orbital or spherical shape. The ball further includes an internal frame that supports the outer shell. The internal frame holds a member in a rotating engagement within the ball. The member includes a solar panel and motion-activated lights. The motion-activated lights may flash when the ball is impacted.

When the ball is thrown, the impact of the outer shell of the ball striking the ground or floor activates the motion-activated lights to cause the lights to flash or shine. The impact of the ball against the ground or floor also causes the member to rotate or to at least partially rotate. This rotation causes the lights to move within the ball.

The rotation of the member in the frame also promotes and urges the member to position the solar panel in an upward-facing position such that radiation from the sun or lights may be received by the solar panel. The member is shaped to have its center of gravity spaced from an axis of rotation of the member. As such, the member rotates within the ball to find an equilibrium with its center of gravity closer to the ground or floor. This orients the solar panel in an upward facing direction, so that the ball is being charged when solar radiation or light radiation is available.

The outer shell is made of a light-weight plastic material that allows the radiation to pass through the outer shell and reach the solar panel in order to charge the ball. The light-weight plastic material also allows the ball to bounce. The light-weight plastic material also withstands the compression forces of an animal chewing on the ball or biting the ball.

The member includes the solar panel that powers the motion-activated lights. As such, the ball does not require batteries or for the operator to recharge the batteries of the ball by plugging the ball into an electrical outlet. This provides for an essentially smooth outer surface of the outer shell of the ball. This is important since an animal or dog will be less likely to damage or destruct the ball through normal chewing and playing if there is no lid, screw-hole, compartment, or the like on the exterior surface of the outer shell. The lights and solar panel are internal to both the outer shell and the frame. This keeps these more delicate components safe from an animal chewing or biting on the ball.

In another aspect, the present invention provides a solar-powered, flashing ball, which includes an outer shell having an orbital or spherical shape, an internal frame to support the outer shell, and a rotating member. The rotating member includes a solar panel and at least one motion-activated light. The rotating member is held in a rotating engagement with the internal frame.

In another aspect, a solar-powered, flashing ball is provided. The solar-powered, flashing ball includes an outer shell having an orbital shape. The outer shell includes a first outer shell half and a second outer shell half. The outer shell defines an interior with an interior surface. The solar-powered, flashing ball further includes an internal frame to support the outer shell. The internal frame includes a first frame half and a second frame half. The internal frame defines an interior. Each of the first frame and the second frame includes a plurality of supports. Exterior surfaces of the supports are in contact with the interior surface of the outer shell. The frame forms a first hub and a second hub. A rotating member is positioned in the interior of the frame. The rotating member includes a housing, a solar panel, a motion-activated switch or sensor, and lights. The housing includes a first axle and a second axle. The rotating member is mounted in a rotating engagement within the interior of the frame. The first axle is rotatably engaged to the first hub, and the second axle is rotatably engaged to the second hub. The rotating member rotates in the interior of the frame.

In a further aspect, a flashing pet toy is provided. The flashing pet toy includes an outer shell having an orbital or spherical shape and an internal frame to support the outer shell. The internal frame comprises hubs. The flashing pet toy further includes a rotating member, which includes lights that flash. The rotating member is mounted in a rotating engagement with the hubs of the frame.

In a still further aspect, a solar-powered, flashing ball is provided. The solar-powered, flashing ball includes an outer shell having an orbital shape. A rotating member is held in a rotating engagement within the shell. The rotating member includes a solar panel and motion-activated lights. The rotating member has an axis of rotation and a center of gravity, and the center of gravity is positioned a distance from the axis of rotation.

In a still further aspect, a method of constructing a solar-powered ball is provided. The method includes providing an outer shell having an orbital shape. The outer shell includes a first outer shell half and a second outer shell half. The outer shell defines an interior with an interior surface. The method includes providing an internal frame to support the outer shell. The internal frame includes a first frame half and a second frame half. The frame defines an interior. Each of the first frame and the second frame comprise a plurality of supports. Exterior surfaces of the supports are in contact with the interior surface of the outer shell. The method further includes forming a first hub and a second hub with the internal frame. The method further includes positioning a rotating member in the interior of the frame. The rotating member includes a housing, a solar panel, a motion-activated switch or sensor, and lights. The housing includes a first axle and a second axle. The method further includes mounting the rotating member in a rotating engagement within the interior of the frame. The first axle is rotatably engaged to the first hub, and the second axle is rotatably engaged to the second hub. The rotating member rotates in the interior of the frame.

In a still further aspect, a lighted ball is provided. The lighted ball includes an outer shell having an orbital or a spherical shape. An internal frame supports the outer shell. The internal frame comprises supports that are curved to contact an inner surface of the outer shell. A member is engaged to the internal frame. The member includes at least one light.

In a still further aspect, a method of recharging a solar-powered pet toy is provided. The method includes providing the solar-powered pet toy, which includes an outer shell, an internal frame to support the outer shell, and a rotating member. The internal frame includes supports that contact an inner surface of the outer shell. The rotating member includes a solar panel and at least one light. The member is rotatably engaged to the internal frame. The method further includes throwing or tossing the pet toy, and the member rotating to position the solar panel to receive solar or light radiation. The method further includes recharging the pet toy from the solar or light radiation received by the solar panel.

Other aspects of the invention are described in detail below.

BRIEF DESCRIPTION OF DRAWINGS

FIG. 1 is a perspective view of the ball.
FIG. 2 is a perspective view of the ball engaged to the optional thrower.
FIG. 3 is a front view of the ball.

DETAILED DESCRIPTION OF EMBODIMENTS

Figure 4:
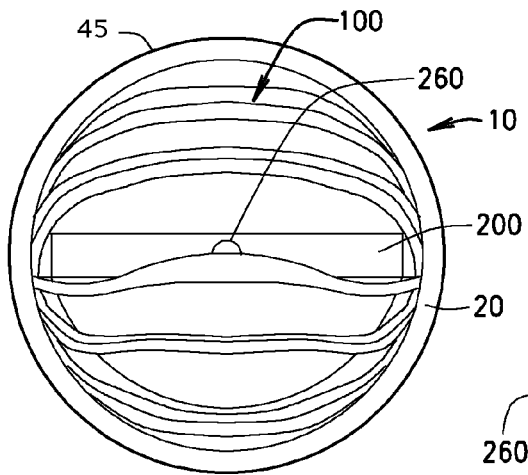
FIG. 4 is a rear view of the ball.

A solar-powered ball will now be described with reference to the FIGURES. A solar-powered ball 10 is shown in FIGS. 1-14. The ball 10 comprises an outer shell 20 that surrounds an internal frame 100. The ball 10 may be used for play with or without pets. For example, the ball 10 may be thrown manually, by a thrower, or by other devices. In FIG. 1, the ball 10 is shown engaged to an optional thrower 12. Upon impact with the ground or floor, the ball 10 flashes.

The ball 10 has the outer shell 20 that forms its exterior. The frame 100 is positioned inside of the outer shell 20. The frame 100 is in contact with an inner surface 35 of the outer shell 20. A member with a power unit and at least one light is held by the frame 100. The at least one light flashes or glows within the ball 10 to attract attention of the pet. The construction of the outer shell 20 and its frame 100 makes it difficult for the pet to penetrate the outer shell 20 or to destroy the ball 10. The member with the power unit and the at least one light remain safely protected inside of the ball 10, as the frame 100 and outer shell 20 provide a protective cover for the ball 10.

The member includes the power unit to supply electrical power to the at least one light. The member is held by the internal frame 100 in the interior of the ball 10. The member may include lights in various positions about the member. The power unit may include at least one solar panel or cell that powers the ball 10.

Figure 10:
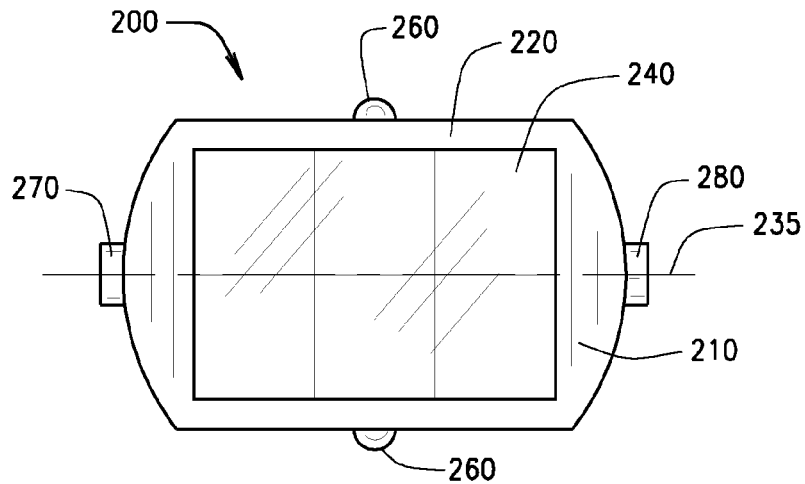
FIG. 10 is top view of the member.
Figure 11:
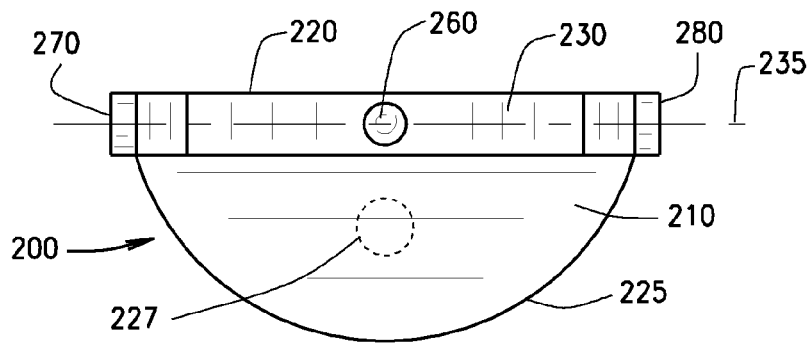
FIG. 11 is a side view of the member.
Figure 12:
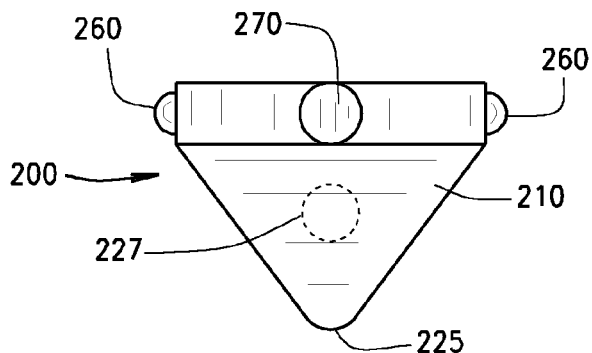
FIG. 12 is an end view of the member.

In one aspect, the internal frame 100 holds a member 200, which is shown separate from the ball 10 in FIGS. 10-12. The member 200 includes a power unit and at least one light that flashes or glows.

Figure 9:
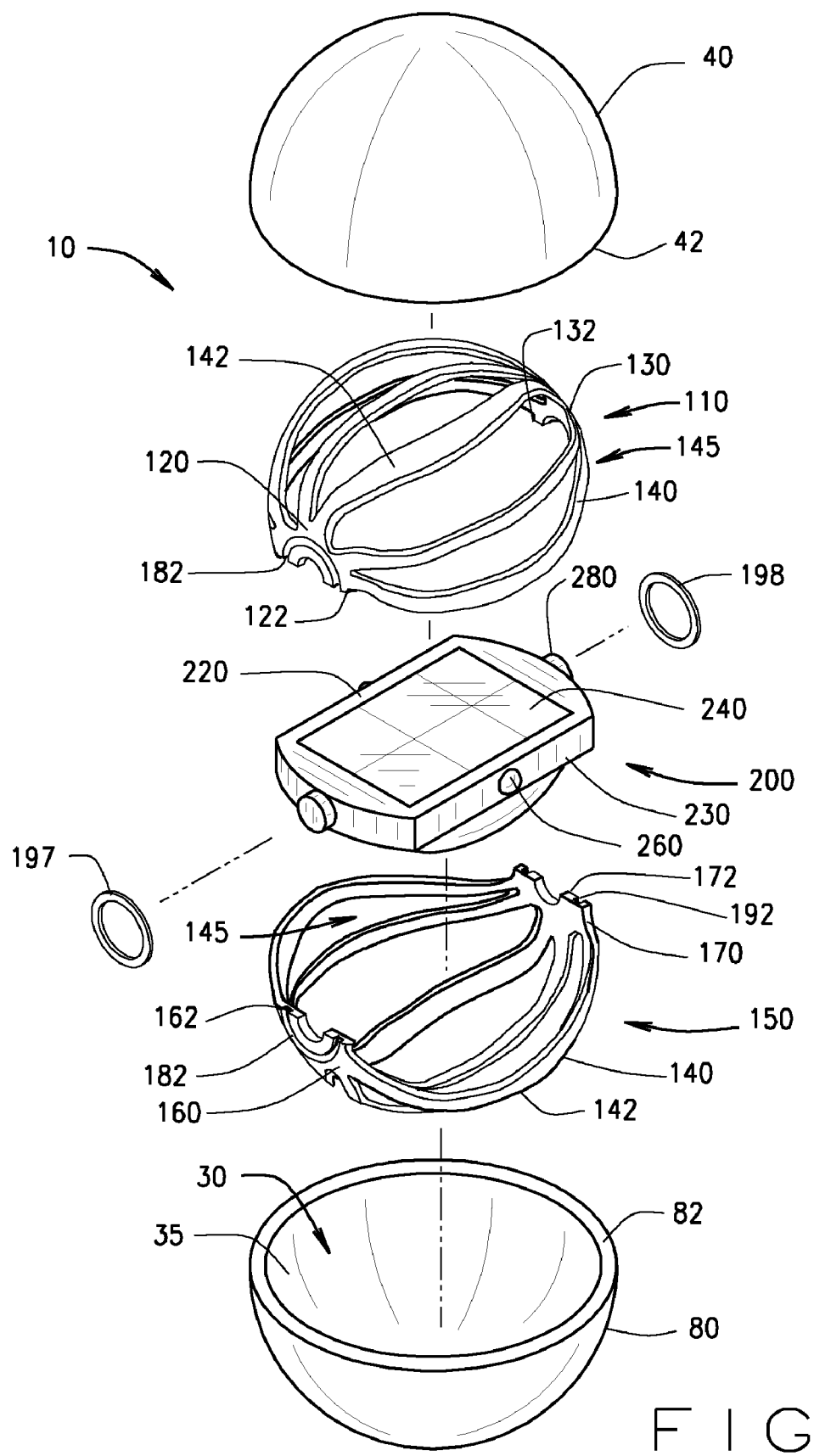
FIG. 9 is an exploded view of the ball.

The outer shell 20 includes a first outer shell half 40 and a second outer shell half 80. An exploded view of the ball 10 is shown in FIG. 9. Each of the first outer shell half 40 and the second outer shell half 80 have a generally hemispherical and hollow shape. The combination of the first outer shell half 40 and the second outer shell half 80 forms the outer shell 20. A first outer shell rim 42 of the first outer shell half 40 is glued, welded, or otherwise adhered or attached to a second outer shell rim 82 of the second outer shell half 80. The outer shell 20 has an orbital or spherical shape. The outer shell 20 is made from a thermoplastic, such as a polymeric material.

The outer shell 20 defines an interior 30 that houses the internal frame 100 and the member 200. The outer shell 20 includes the interior surface 35 (shown in FIG. 9) and an exterior surface 45. The exterior surface 45 is essentially smooth and free of any openings or gaps.

The internal frame 100 is positioned on the inside of the outer shell 20. With reference to FIG. 9, the internal frame 100 includes a first frame half 110 and a second frame half 150. The first frame half 110 includes a first end 120 and a second end 130. Likewise, the second frame half 150 includes a first end 160 and a second end 170. The first end 120 and the first end 160 are urged together during the assembly of the internal frame 100. Specifically, an edge 122 of the first end 120 and an edge 162 of the first end 160 are urged together. Further, an edge 132 of the second end 130 and an edge 172 of the second end 170 are also urged together.

The first frame half 110 and the second frame half 150 form the internal frame 100, which supports the outer shell 20 against the impact forces of the ball 10 landing and hitting the ground or floor, as well as the compression and bite forces from a dog or animal playing with or chewing upon the ball 10. The internal frame 100 forms a lattice structure with openings to support the outer shell 20. The internal frame 100 allows solar or light radiation to pass through its lattice structure and reach the member 200.

The internal frame 100 further forms a cage or a matrix that holds the member 200 therein. The member 200 preferably rotates. The member 200 is positioned in an interior 105 of the frame 100. Each of the first frame half 110 and the second frame half 150 include a plurality of supports 140. The supports 140 form ribs or supporting members that extend from the first end 120 to the second end 130 and also from the first end 160 to the second end 170. The supports 140 may be provided in pairs 145. Exterior surfaces 142 of the supports 140 are in contact with the interior surface 35 of the outer shell 20. At least a portion of the exterior surface 142 of the supports 140 is in contact with the interior surface 35 of the outer shell 20.

Figure 5:
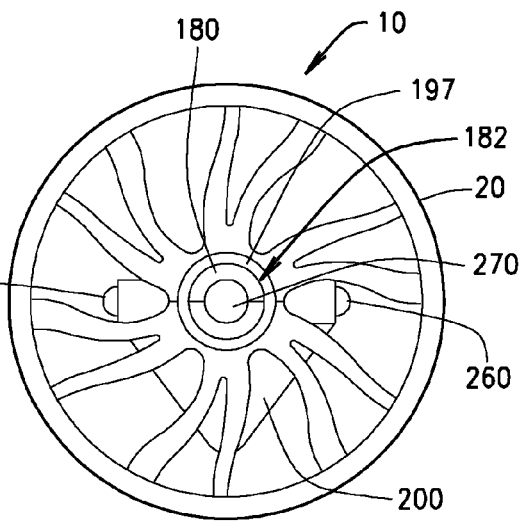
FIG. 5 is a first side view of the ball.
Figure 6:
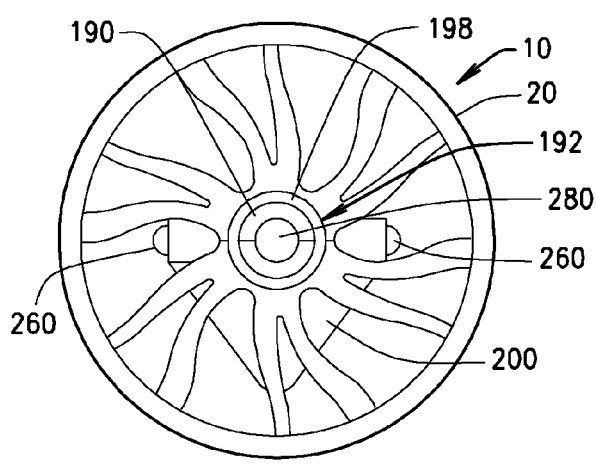
FIG. 6 is a second side view of the ball.
Figure 7:
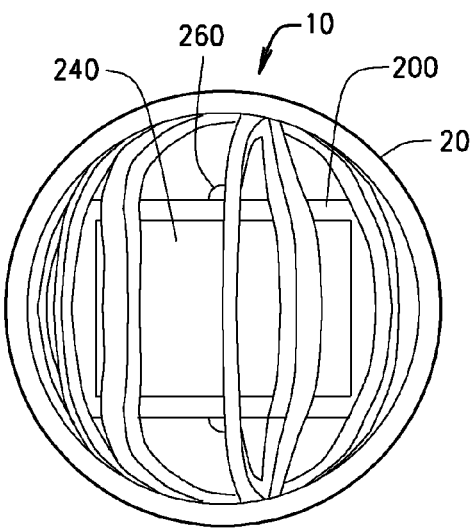
FIG. 7 is top view of the ball.
Figure 8:
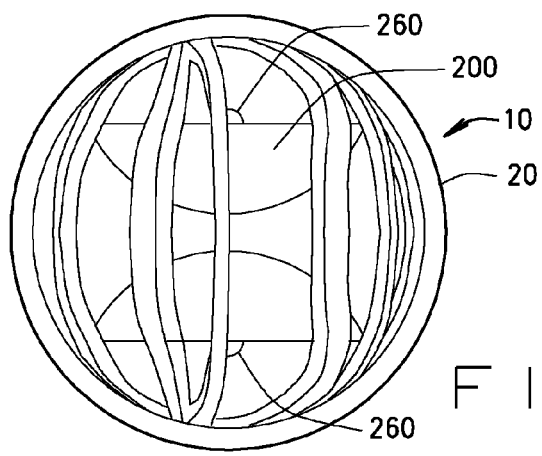
FIG. 8 is bottom view of the ball.

With reference to FIGS. 5 and 6, the first end 120 and the first end 160 form a first hub 180. Similarly, the second end 130 and the second end 170 form a second hub 190. The first hub 180 and the second hub 190 receive the member 200 in a rotating engagement.

The first hub 180 forms a groove 182, while the second hub 190 forms a groove 192. A first ring 197 holds the first hub 180 together, and a second ring 198 holds the second hub 190 together. The grooves 182 and 192 receive the first ring 197 and the second ring 198. The first ring 197 and the second ring 198 may be made from a strong and durable material such as a metal or metal alloy. The first ring 197 holds the first end 120 and the first end 160 together, while the second ring 198 holds the second end 130 and the second end 170 together.

The member 200 will now be described with reference to FIGS. 10-12. The member 200 includes a housing 210 that contains a circuit 250. The housing 210 includes an up-facing surface 220 and a down-facing surface 225. A solar panel 240 is positioned on the up-facing surface 220. Opposite of the solar panel 240, the housing 210 includes a down-facing surface 225.

The housing further includes a first axel 270 and a second axel 280. The first hub 180 receives the first axel 270 in a rotatable engagement, while the second hub 190 receives the second axel 280 in a rotatable engagement. The member 200 is in a freely rotating engagement with the first hub 180 and the second hub 190.

The member 200 includes a center of gravity 227 that is positioned away from the axis of rotation 235 of the member 200. This promotes the rotation of the member 200. The center of gravity 227 is a distance away from axis of rotation 235. The distance will vary depending upon the size, shape and weight of the member 200. In the embodiment shown in the Figures, the center of gravity 227 is positioned between the axis of rotation 235 and the down-facing surface 225 of the housing 210. The down-facing surface 225 will generally be on an opposite side of the member 200 as the up-facing surface 220.

Figure 14:
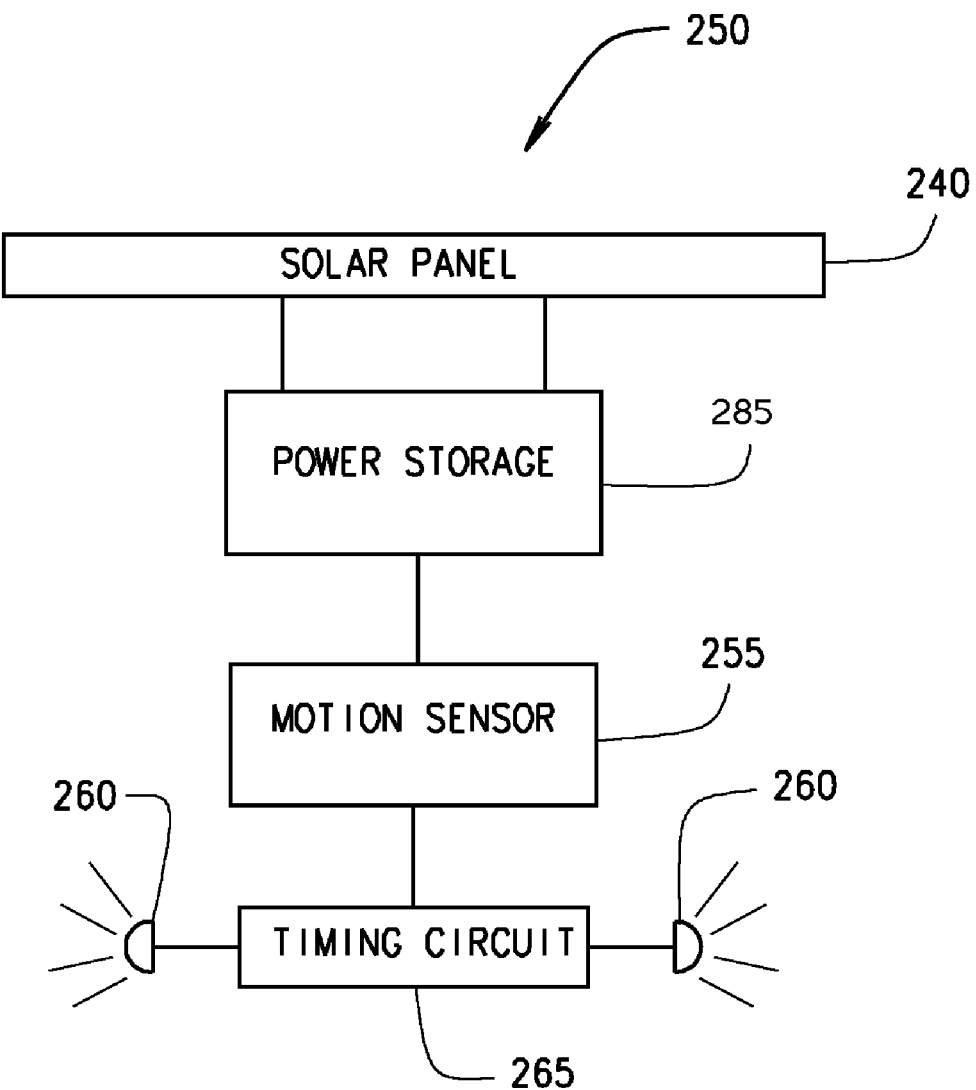
FIG. 14 is a diagram showing the electrical components of the member.

As shown in FIG. 14, the housing further includes the circuit 250, which controls and powers the ball 10. The circuit 250 includes and electrically connects a motion-activated switch or sensor 255, lights 260, and a timing circuit 265. When the ball 10 is thrown, dropped, or otherwise jarred, such motion activates the motion-activated switch or sensor 255, which causes the lights 260 to flash via the timing circuit 265. The motion-activated switch or sensor 255 may include a spring switch, vibration switch, accelerometer, or the like. As shown in FIG. 14, the solar panel 240 is in electrical communication with the power storage circuit 285, which may include a capacitor or a battery. The solar panel 240 converts the radiation to electrical current which is directed to the power storage circuit 285 for storage and/or for directly powering the lights 260.

The lights 260 may flash or shine constantly for a defined time period such as, for example, 2 to 30 seconds, or other manufacturer defined sequences. Further, the timing circuit 265 may cause the lights 260 to flash at a regular interval or at varied intervals with flashes of varying duration and/or non-flashing periods.

The first frame half 110 and the second frame half 150 may be made of a polycarbonate material. The supports 140 radiate from the first ends 120 and 160 in a curved fashion, respectively, to reach the second ends 130 and 170, respectively. The curved fashion allows the supports to 140 to contact the interior surface 35 of the outer shell 20 in a supportive engagement. In the embodiment shown in the FIGURES, each of the first frame half 110 and the second frame half 150 include three pairs 145 of the supports 140. As such, the internal frame 100 includes twelve supports 140. One of ordinary skill in the art will recognize that the number and positioning of the supports 140 may vary.

The first axel 270 and second axel 280 are held in rotatable engagement by the hubs 180 and 190. The axels 270 and 280 may further contact the interior surface 35 of the outer shell 20. The axels 270 and 280, in conjunction with the member 200, extend the entire or nearly the entire diameter of the ball 10. As such, the axels 270 and 280 and the member 200 provide structural rigidity to the outer shell 20.

In the embodiment shown, the housing 210 includes a generally triangular shape. With reference to FIGS. 11 and 12, the shape of the housing 210 may vary so long as the center of gravity 227 of the rotating member is positioned between the axis of rotation 235 and the portion of the member 200 closest to the outer shell 20. The center of gravity 227 of the rotating member is a distance from the axis of rotation 235 to encourage the member 200 to rotate when the ball 10 has moved.

In the embodiment shown, the center of gravity 227 is between the axis of rotation 235 and the down-facing surface 225. As such, the center of gravity 227 of the member 200 is between the up-facing surface 220 and the down-facing surface 225.

The lights 260 include LED lights positioned on the lateral surfaces 230 of the housing 210. Any number of lights may be incorporated into or positioned on the housing 210. One, two, three, four, five, six or more LED lights may be positioned or incorporated into the housing 210. The lights 260 may further be provided on other surfaces of the housing, such as the up-facing surface 220 or the down-facing surface 225. The lights 260 may include different colors and/or lights with different intensities. Other types of lights may be used for the member 200.

By incorporating the center of gravity 227 of the rotating member away from the axis of rotation 235, the member 200 approximately rotates until it reaches equilibrium. This rotation or partial rotation moves the flashing lights 260 in a pattern or movement that animals may find attractive or curious, thus enticing the animal to play with the ball 10.

The configuration of the housing 210 also promotes the recharging of the power storage circuit 285 via the solar panel 240. With the center of gravity 227 positioned between the outer shell 20 and the axis of rotation 235, the ball 10 itself will roll and the member 200 will rotate in order for the ball 10 to equilibrate with the center of gravity 227 below the axis of rotation 225.

Figure 13:
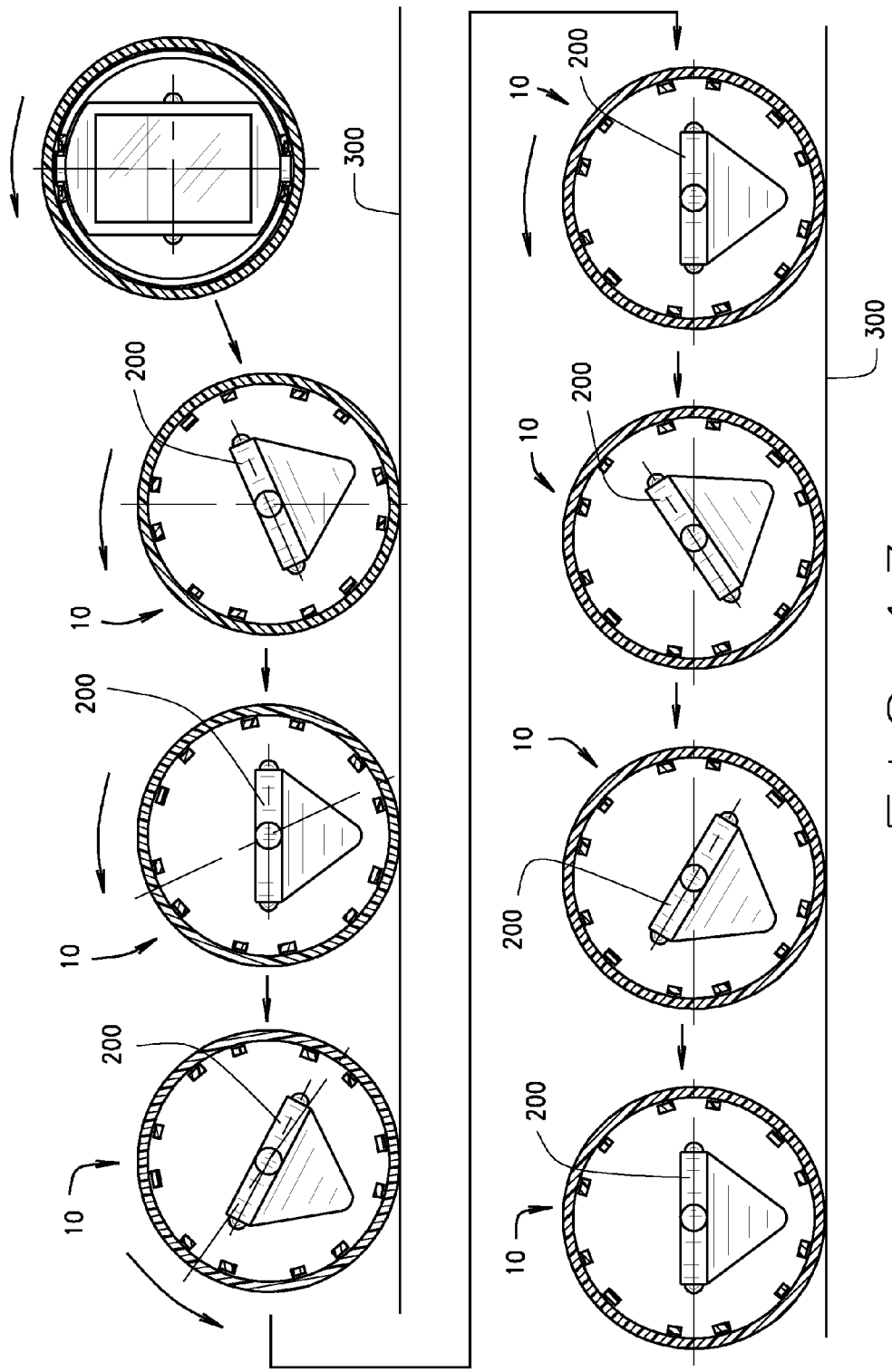
FIG. 13 is a series of views showing the action of the ball and the rotation of the member when the ball is impacted.

With reference to FIG. 13, the construction of the ball 10 encourages the solar panel 240 to orient in an upward facing direction. For example, when the ball lands on ground 300 or other playing surface, the ball 10 will generally keep rolling or moving and the member 200 will keep rotating until equilibrium is reached. The ball 10 will generally roll or move until the center of gravity 227 is positioned in a half of the ball 10 closer to the ground 300, and the member 200 will rotate via the axel 270 and the axel 280 until the center of gravity 227 reaches equilibrium. The erratic movement of the ball 10 and the member 200 may entice the animal or pet to play with the ball 10. Of course, if the ball 10 lands on soft surface, such as plush carpet or wet ground, then the rolling or moving of the ball 10 may be limited. Nonetheless, the member 200 will still rotate within the ball 10.

The first outer shell half 40 and the second outer shell half 80 are formed through the thermal processing of thermal plastics. The outer shell 20 is made of a transparent or clear plastic material. The thermal plastic for the outer shell 20 should be made of a light-weight material that allows the solar energy to pass through the outer shell 20 in order to charge the ball 10. The outer shell 20 has a thickness of approximately 1 mm to approximately 10 mm, although the thickness may vary considerably for larger embodiments of the ball 10. Thermal plastic urethane (TPU) is one suitable thermal plastic. A thermal plastic urethane with a 95 hardness is suitable.

Those skilled in the art will appreciate that variations from the specific embodiments disclosed above are contemplated by the invention. The invention should not be restricted to the above embodiments, but should be measured by the following claims.

What is claimed:

1. A solar-powered, flashing ball, comprising:
    an outer shell having an orbital or a spherical shape;
    an internal frame to support the outer shell, wherein the internal frame comprises supports that are curved to contact an inner surface of the outer shell; and,
    a member comprising a solar panel, at least one motion-activated light, a first axle, and a second axle; wherein the first axle and the second axle are rotatably engaged to the internal frame.

2. The solar-powered ball according to claim 1, wherein the first axle and the second axle rotate relative to the internal frame.

3. The solar-powered ball according to claim 1, wherein the member is held in a freely rotating engagement with the internal frame.

4. The solar-powered ball according to claim 1, wherein the member orients the solar panel in an upward facing direction.

5. The solar-powered ball according to claim 1, wherein the outer shell allows radiation to pass through it in order to charge the solar panel.

6. The solar-powered ball according to claim 1, wherein a center of gravity of the member is a distance away from an axis of rotation of the member.

7. The solar-powered, flashing ball according to claim 1, wherein a center of gravity of the member is positioned between an axis of rotation and the outer shell.

8. The solar-powered, flashing ball according to claim 1, wherein the internal frame forms a first hub and a second hub, wherein the first axle is held in rotatable engagement with the first hub, and the second axle is held in rotatable engagement with the second hub.

9. The solar-powered, flashing ball according to claim 1, wherein the internal frame comprises a first frame and a second frame, wherein each of the first frame and the second frame comprise a plurality of supports; wherein at least a portion of an exterior surface of the supports is in contact with an interior surface of the outer shell.

10. The solar-powered, flashing ball according to claim 9, wherein the supports form ribs or supporting members that extend from a first end of the first frame to a second end of the first frame, wherein the supports form ribs or supporting members that extend from a first end of the second frame to a second end of the second frame.

11. The solar-powered, flashing ball according to claim 10, wherein pairs of the supports extend from the first end of the first frame to the second end of the first frame, wherein additional pairs of the supports extend from the first end of the second frame to the second end of the second frame.

12. The solar-powered, flashing ball according to claim 1, wherein the outer shell is made from a thermal plastic urethane.

13. The solar-powered, flashing ball according to claim 1, wherein the member further comprises a housing; the solar panel positioned on a surface of the housing; and a motion-activated switch or sensor to operate the at least one motion-activated light; and the housing comprising the first axle and the second axle.

14. The solar-powered, flashing ball according to claim 13, wherein the frame forms a first hub and second hub, wherein the first hub receives the first axle in a rotating engagement and the second hub receives the second axle in a rotating engagement.

15. The solar-powered, flashing ball according to claim 1, wherein the member includes an up-facing surface and a down-facing surface; the solar panel is positioned on the up-facing surface; and a center of gravity of the member is between the up-facing surface and the down-facing surface.

16. The solar-powered, flashing ball according to claim 1, wherein the member includes the first axle and the second axle that define an axis of rotation; wherein a center of gravity of the member is a distance from the axis of rotation.

17. A solar-powered, flashing ball, comprising:
    an outer shell having an orbital shape, wherein the outer shell comprises a first outer shell half and a second outer shell half, wherein the outer shell defines an interior, wherein the outer shell has an interior surface;
    an internal frame to support the outer shell, the internal frame comprising a first frame half and a second frame half, wherein the internal frame defines an interior, wherein each of the first frame half and the second frame half comprise a plurality of supports; exterior surfaces of the supports are in contact with the interior surface of the outer shell; the frame forming a first hub and a second hub;
    a rotating member positioned in the interior of the frame, the rotating member comprising a housing, a solar panel, a motion-activated switch or sensor, and lights;
    the housing comprising a first axle and a second axle; and
    the rotating member mounted in a rotating engagement within the interior of the frame, wherein the first axle is rotatably engaged to the first hub, and the second axle is rotatably engaged to the second hub; wherein the rotating member rotates in the interior of the frame.

18. A flashing pet toy, comprising:
    an outer shell having an orbital or spherical shape;
    an internal frame comprising a plurality of supports to support the outer shell;
    the internal frame comprising a first hub and a second hub, wherein the plurality of supports extend from the first hub to the second hub;
    a rotating member, the rotating member comprising lights that flash; and
    the rotating member mounted in a rotating engagement with the hubs of the internal frame.

19. A solar-powered, flashing ball, comprising:
    an outer shell having an orbital shape;
    a frame internal to the outer shell, wherein the frame forms a cage or a matrix;
    a rotating member, the rotating member comprising a solar panel and a motion-activated light;
    the rotating member held in a rotating engagement within the shell and the frame;
    the rotating member having an axis of rotation; and
    the rotating member having a center of gravity, wherein the center of gravity is positioned a distance from the axis of rotation.

20. The solar-powered, flashing ball according to claim 19, wherein the center of gravity is positioned between the axis of rotation and the outer shell.

21. A method of constructing a solar-powered ball, comprising:
- providing an outer shell having a spherical or an orbital shape, wherein the outer shell comprises a first outer shell half and a second outer shell half, wherein the outer shell defines an interior, wherein the outer shell has an interior surface;
- providing an internal frame to support the outer shell, the internal frame comprising a first frame half and a second frame half, wherein the frame defines an interior, wherein each of the first frame half and the second frame half comprise a plurality of supports; and exterior surfaces of the supports are in contact with the interior surface of the outer shell;
- forming a first hub and a second hub with the internal frame;
- positioning a rotating member in the interior of the frame, the rotating member comprising a housing, a solar panel, a motion-activated switch or sensor, and lights; the housing comprising a first axle and a second axle; and
- mounting the rotating member in a rotating engagement within the interior of the frame, wherein the first axle is rotatably engaged to the first hub, and the second axle is rotatably engaged to the second hub; wherein the rotating member rotates in the interior of the frame.

22. A lighted ball, comprising:
- an outer shell having an orbital or a spherical shape, the outer shell having an essentially smooth outer surface;
- an internal frame inside of the outer shell to support the outer shell, wherein the internal frame comprises supports that are curved, and an external surface of the supports contacts an inner surface of the outer shell; and,
- a member comprising at least one light, the member freely rotatably engaged to the internal frame and the member freely rotates within an interior of the internal frame.

23. A method of recharging a solar-powered pet toy, comprising:
- providing a solar-powered pet toy comprising:
  - an outer shell having a spherical or orbital shape with an essentially smooth surface; an internal frame to support the outer shell, wherein the internal frame comprises supports that contact an inner surface of the outer shell wherein the internal frame comprises openings; and, a rotating member comprising a solar panel and at least one light, the member rotatably engaged to the internal frame, and wherein solar or light radiation passes through the openings of the internal frame;
- throwing or tossing the pet toy, and the member rotating to position the solar panel to receive solar or light radiation; and
- recharging the pet toy from the solar or light radiation received by the solar panel.

* * * * *